United States Patent [19]
Ilcisin et al.

[11] Patent Number: 6,027,661
[45] Date of Patent: Feb. 22, 2000

[54] METHOD OF FABRICATING A CHANNEL SUBSTRATE FOR A PALC DISPLAY PANEL

[75] Inventors: Kevin J. Ilcisin; Thomas S. Buzak, both of Beaverton; Paul C. Martin, Sunriver, all of Oreg.

[73] Assignee: Tektronix, Inc., Wilsonville, Oreg.

[21] Appl. No.: 08/969,179

[22] Filed: Nov. 12, 1997

Related U.S. Application Data

[60] Provisional application No. 60/035,827, Jan. 10, 1997.
[51] Int. Cl.[7] .................................................. B44C 1/22
[52] U.S. Cl. ............................................................... 216/23
[58] Field of Search ................................................. 216/23

[56] References Cited

U.S. PATENT DOCUMENTS

| | | | |
|---|---|---|---|
| 5,897,415 | 4/1999 | Roberson | 445/50 |
| 5,917,283 | 6/1999 | Roberson | 313/582 |
| 5,948,228 | 9/1999 | Hinchliffe | 204/485 |

*Primary Examiner*—Timothy M. Speer
*Attorney, Agent, or Firm*—John D. Winkelman; John Smith-Hill

[57] ABSTRACT

A channel member for a PALC panel is fabricated from a substrate of hard transparent material by forming a layer of conductive material over an upper surface of the substrate, forming a layer of insulating material over the layer of conductive material, removing the layer of insulating material in accordance with a predetermined spatial pattern so as to expose predetermined portions of the layer of conductive material, and removing exposed portions of the layer of conductive material by erosion until parts of the upper surface of the substrate are exposed.

7 Claims, 3 Drawing Sheets

METHOD OF FABRICATING A CHANNEL SUBSTRATE FOR A PALC DISPLAY PANEL

CROSS REFERENCED TO RELATED APPLICATIONS

This application claims the benefit of U.S. Provisional Application Ser. No. 60/035,827, filed Jan. 10, 1997.

BACKGROUND OF THE INVENTION

This invention relates to a method of fabricating a channel substrate for a plasma addressed liquid crystal (PALC) display panel.

U.S. Pat. No. 5,077,553 discloses apparatus for addressing data storage elements. A practical implementation of the apparatus shown in U.S. Pat. No. 5,077,553 is illustrated schematically in FIG. 3 of the accompanying drawings.

The display panel shown in FIG. 3 comprises, in sequence from below, a polarizer 2, a channel member 4, a cover sheet 6 (commonly known as a microsheet), a layer 10 of electro-optic material, an array of parallel transparent data drive electrodes (only one of which, designated 12, can be seen in the view shown in FIG. 3), an upper substrate 14 carrying the data drive electrodes, and an upper polarizer 16. The channel member 4 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. In the case of a color display panel, the panel elements include color filters (not shown) between the layer 10 and the upper substrate 14. The region of the upper surface of the display panel that bounds the panel element constitutes a single pixel 30 of the display panel.

When the anode in one of the channels is connected to ground and a suitable negative voltage is applied to the cathode in that channel, the gas in the channel forms a plasma that provides a conductive path at the lower surface of the cover sheet 6. If a data drive electrode is at ground potential, there is no significant electric field in the volume element of electro-optic material in the panel element at the crossing of the channel and the data drive electrode and the panel element is considered to be off, whereas if the data drive electrode is at a substantially different potential from ground, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material is a twisted nematic liquid crystal material that rotates the plane of polarization of linearly polarized light passing therethrough by an angle that is a function of the electric field in the liquid crystal material. When the panel element is off, the angle of rotation is 90°; and when the panel element is on, the angle of rotation is zero.

The panel is illuminated from the underside by an extended light source (not shown) that emits unpolarized white light. A rear glass diffuser 18 having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the liquid crystal material toward the upper polarizer 16 and a viewer 32. If the panel element is off, the plane of polarization of linearly polarized light passing through the volume element of liquid crystal material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of liquid crystal material. The plane of polarization of light incident on the upper polarizer element is at 0° and therefore the light is blocked by the upper polarizer element and the pixel is dark. If the electric field in the volume element of liquid crystal material is intermediate the values associated with the panel element being off and on, light is passed by the upper polarizer element with an intensity that depends on the electric field, allowing a gray scale to be displayed.

It is conventional to assemble a display panel of the kind shown in FIG. 3 by forming a channel subassembly, including the channel member and the cover sheet, forming an upper substrate subassembly, including the upper substrate, the data drive electrodes and the layer of electro-optic material, and attaching the upper substrate subassembly to the channel subassembly.

There are three principal methods currently used for fabricating the channel member of a PALC display panel. In accordance with one method, a glass substrate is etched to form an array of parallel channels in its upper surface and the anodes and cathodes are then formed in the channels. This is the method by which the channel member 4 shown in FIG. 3 is formed.

One of the other principal methods of fabricating the channel member will be described with reference to FIGS. 4A–4D. Referring to FIG. 4A, a glass substrate 40 having non-scattering upper and lower surfaces is provided, and a layer of a tough inorganic material capable of serving as a blast stop material, such as a metal, e.g. chromium, is formed on the upper surface of the glass sheet and is patterned to define separate strips 42 at the desired pitch of the channels. A thin layer 44 of a conductive material, such as a nickel frit, is screened over the strips 42 (FIG. 4B) and is dried and a thicker layer 46 of insulating material, such as glass frit, is screened over the conductive layer 44 and dried. A layer of metal, such as chromium, is deposited over the layer of insulating material and is patterned using conventional photolithographic techniques to define rib blocks 48. The projection of the rib blocks 48 into the plane of the upper surface of the glass sheet 40 is in interdigitating relationship with the strips 42. The structure shown in FIG. 4B is baked in order to fuse the nickel and glass frits and then undergoes a blanket sandblast operation over its upper surface. The rib block material is resistant to sandblasting and accordingly portions of the fused glass frit layer 46 that are exposed between the rib blocks, and eventually portions of the fused nickel frit layer 44 that are exposed by partial removal of the fused glass frit layer 46, are eroded and channels 50 are formed between the rib blocks, as shown in FIG. 4C. The sandblasting operation continues until the strips 42 are exposed. The material of the strips 42 is resistant to sandblasting and therefore the strips 42 are not removed by erosion. The strips 42 of blast stop material are chemically removed, exposing the non-scattering upper surface of the glass substrate. The channel member is then complete (FIG. 4D) and between each two adjacent channels 50 is a rib 52 composed of a conductive strip 44', an insulating strip 46' and a rib block 48. The cover sheet is attached to the channel member to form the channel subassembly.

In operation of a PALC display panel having a channel member fabricated by the method described with reference to FIGS. 4A–4D, alternate conductive strips 44' are connected to ground and thus serve as anodes, and the intervening strips 44' serve as cathodes.

The strips 42 of blast stop material are formed in the method described with reference to FIGS. 4A–4D in order to protect the upper surface of the glass substrate 40. Thus, the strips 42 permit removal of all of the conductive layer 44 between the flanks of the two adjacent ribs 52 without also sandblasting the upper surface of the glass substrate 40 and degrading its non-scattering quality, so that it becomes scattering and depolarizes light entering the channel from the substrate 40.

SUMMARY OF THE INVENTION

In accordance with a first aspect of the present invention there is provided a method of fabricating a channel member for a PALC panel, comprising providing a substrate of hard transparent material having upper and lower surfaces, forming a layer of conductive material over the upper surface of the substrate, forming a layer of insulating material over the layer of conductive material, removing the layer of insulating material in accordance with a predetermined spatial pattern so as to expose predetermined portions of the layer of conductive material, and removing exposed portions of the layer of conductive material by erosion until parts of the upper surface of the substrate are exposed.

In accordance with a second aspect of the present invention there is provided a method of fabricating a channel subassembly for a PALC panel, comprising providing a substrate of hard transparent material having upper and lower surfaces, forming a layer of conductive material over the upper surface of the substrate, forming a layer of insulating material over the layer of conductive material, removing the layer of insulating material in accordance with a predetermined spatial pattern so as to expose predetermined portions of the layer of conductive material, removing exposed portions of the layer of conductive material by erosion until parts of the upper surface of the substrate are exposed, and attaching a cover sheet to the upper surface of the channel member.

In accordance with a third aspect of the present invention there is provided a channel member for a PALC panel, comprising a substrate of hard transparent material having upper and lower surfaces, a plurality of ribs over the upper surface of the substrate, each rib including a layer of conductive material and a layer of insulating material and the ribs having parts of the upper surface of the substrate exposed therebetween, and wherein at least the exposed parts of the upper surface of the substrate scatter light passing therethrough.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals are used to denote corresponding elements.

Words of orientation and position, such as upper and lower, are used in the specification to establish orientation relative to the drawings and are not intended to be limiting in an absolute sense.

DETAILED DESCRIPTION

Figure 1A:
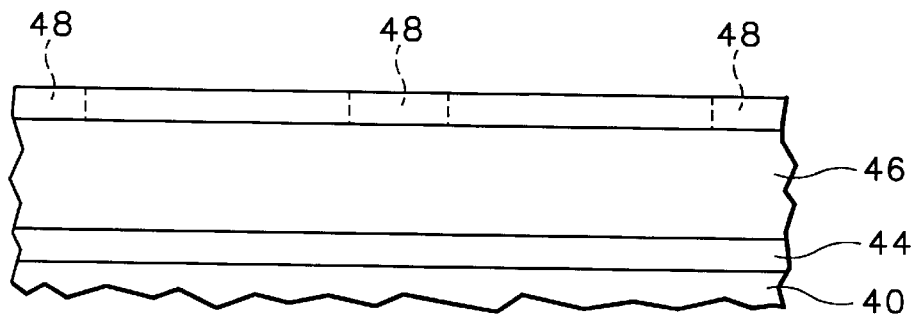
FIGS. 1A and 1B illustrate a method in accordance with the invention for constructing a channel member for a PALC display panel.
Figure 1B:
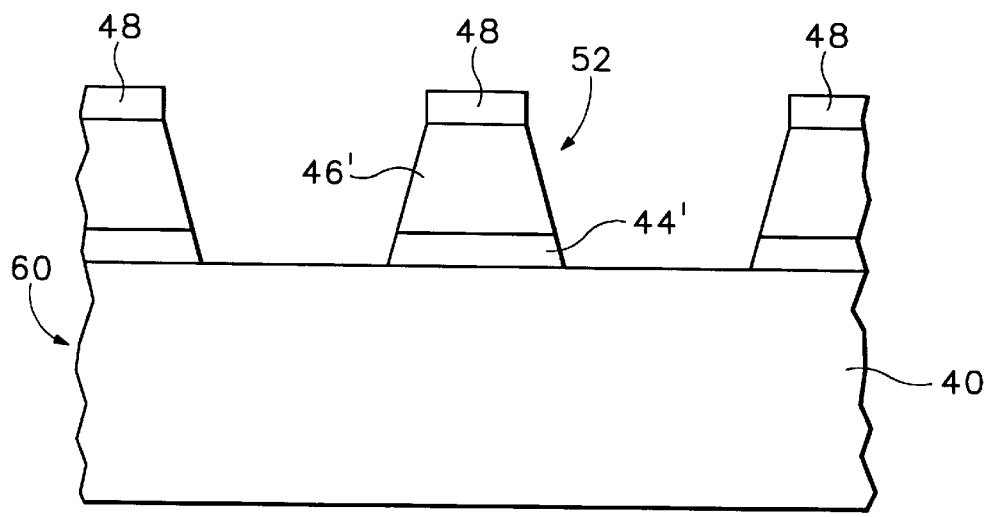
Figure 2:
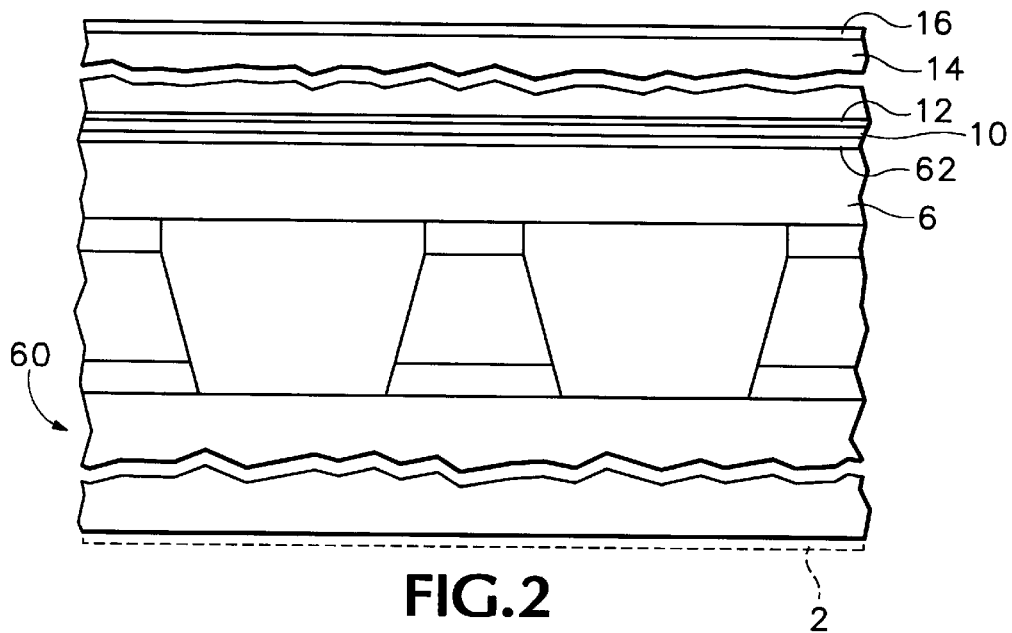
FIG. 2 is a cross-sectional view of a PALC display panel including a channel member fabricated using the method described with reference to FIGS. 1A and 1B.
Figure 3:
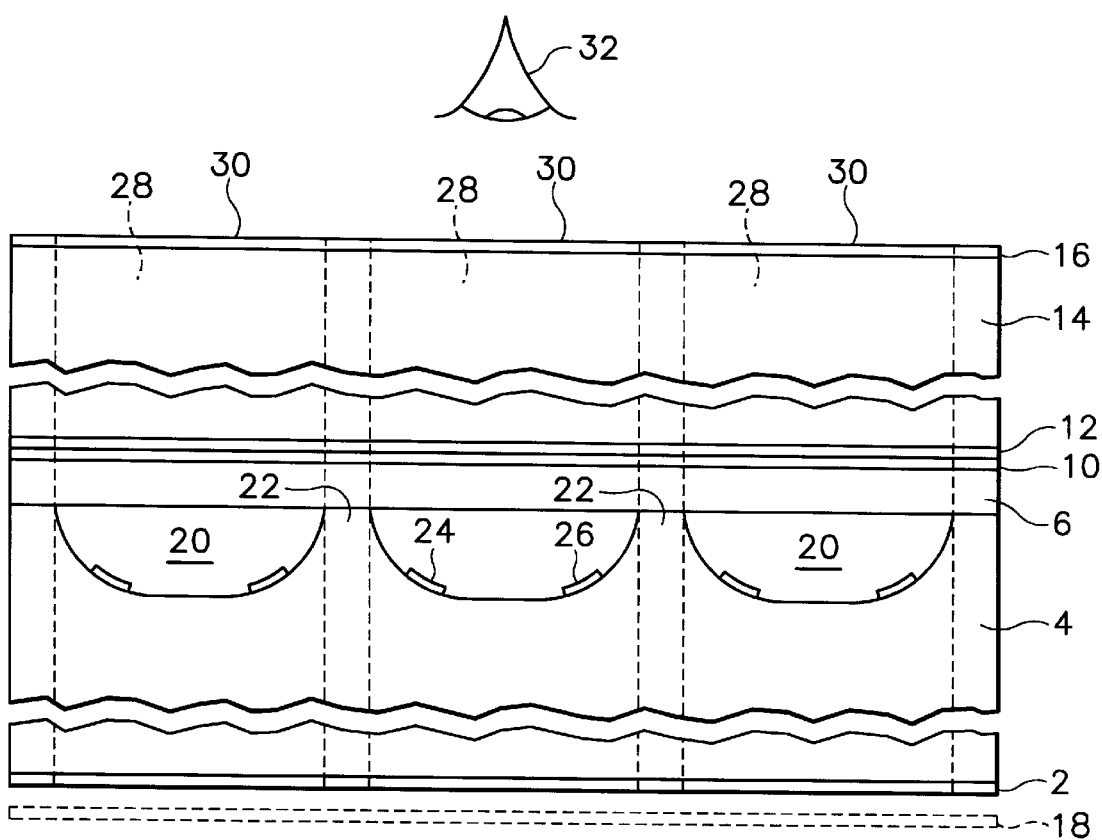
FIG. 3 is a cross-sectional view of a PALC display panel in accordance with the prior art.
Figure 4A:
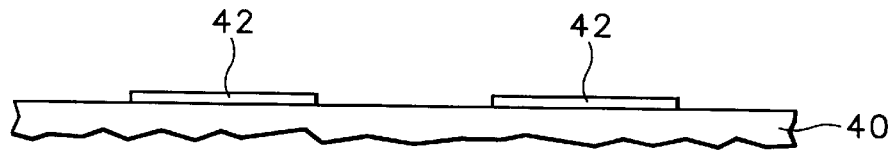
FIGS. 4A–4D illustrate a prior art method of constructing a channel member for a PALC display panel.
Figure 4B:
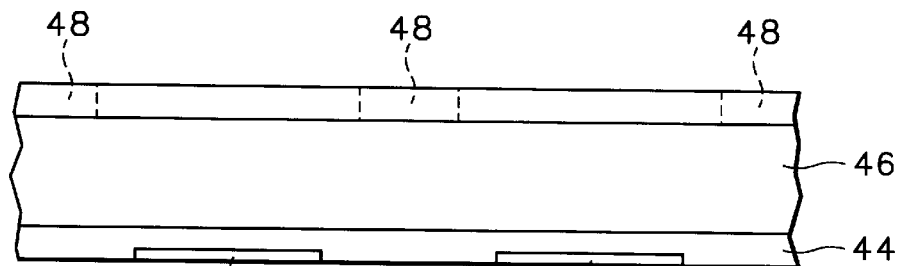
Figure 4C:
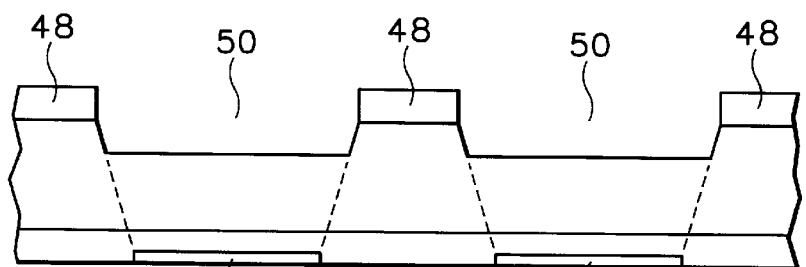
Figure 4D:
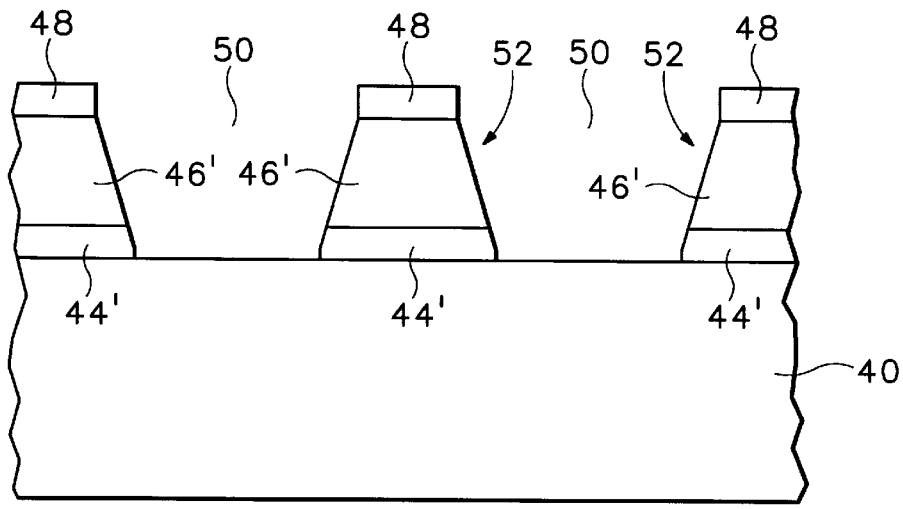

Referring to FIGS. 1A and 1B, a channel member 60 is fabricated by a method similar to that described with reference to FIGS. 4A–4D, but without including strips of blast stop material to protect the upper surface of the glass substrate 40. Accordingly, the upper surface of the glass substrate undergoes erosion by the sandblasting operation and loses its non-scattering characteristics. Referring to FIG. 2, the cover sheet 6 is attached to the channel member 60, and an internal polarizer 62 is provided over the cover sheet, as described in the copending U.S. application Ser. No. 60/014,683 (Attorney Docket 6152-US). The internal polarizer 62 ensures that the light supplied to the liquid crystal layer 10 is correctly polarized. As described in U.S. application Ser. No. 60/014,683, a lower polarizer 2 may be provided, in which case the internal polarizer 62 serves to restore polarization of partially depolarized light rather than to polarize light that is completely unpolarized. Even though the upper surface of the substrate 40 scatters light passing from the glass substrate 40 into the channel 50, it may still be necessary to provide a diffuser upstream of the substrate 40 in order to ensure that the light entering the channel 50 is diffused to a sufficient degree.

An alternative method to form the channel member 60 shown in FIG. 1B involves use of photoresist to form the rib blocks 48. In this case, the structure composed of the glass substrate 40, the strips 42, and the frit layers 44 and 46 is baked in order to fuse the nickel and glass frits and a layer of photoresist, such as Riston, is deposited over the fused layer 46 and is patterned to form the rib blocks.

Another technique to form the channel member 60 is to deposit the frit layers 44 and 46 and deposit a layer of photoresist over the frit layers after drying the frit layers but before fusing. The photoresist is patterned to define the rib blocks and the structure undergoes a soft sandblasting in order to accomplish partial removal of the frit material and form ribs. The photoresist is chemically removed and the structure is baked to fuse the nickel and glass frits.

It will be appreciated that the invention is not restricted to the particular embodiment that has been described, and that variations may be made therein without departing from the scope of the invention as defined in the appended claims and equivalents thereof.

We claim:

1. A method of fabricating a channel member for a PALC panel, comprising:

(a) providing a substrate of hard transparent material having upper and lower surfaces, (b) forming a layer of conductive material over the upper surface of the substrate, (c) forming a layer of insulating material over the layer of conductive material, (d) removing the layer of insulating material in accordance with a predetermined spatial pattern so as to expose predetermined portions of the layer of conductive material, and (e) removing exposed portions of the layer of conductive material by erosion until parts of the upper surface of the substrate are exposed.

2. A method according to claim 1, further comprising, between steps (c) and (d):

depositing a layer of erosion resistant material over the layer of insulating material, and partially removing said layer of erosion resistant material in order to define said predetermined pattern.

3. A method according to claim 1, wherein step (b) comprises depositing a layer of metal frit over the upper surface of the substrate, step (c) comprises depositing a layer of glass frit over the layer of metal frit, and the method further comprises fusing the layer of metal frit and the layer of glass frit.

4. A method according to claim 3, further comprising, between steps (c) and (d):

depositing a layer of erosion resistant material over the layer of glass frit, and partially removing said layer of erosion resistant material in order to define said predetermined pattern.

5. A method according to claim 4, wherein the erosion resistant material is a metal.

6. A method according to claim 4, wherein the erosion resistant material is a photoresist and the step of fusing the layer of metal frit and the layer of glass frit is performed before depositing the layer of photoresist.

7. A method of fabricating a channel subassembly for a PALC panel, comprising:

(a) providing a substrate of hard transparent material having upper and lower surfaces, (b) forming a layer of conductive material over the upper surface of the substrate, (c) forming a layer of insulating material over the layer of conductive material, (d) removing the layer of insulating material in accordance with a predetermined spatial pattern so as to expose predetermined portions of the layer of conductive material, (e) removing exposed portions of the layer of conductive material by erosion until parts of the upper surface of the substrate are exposed, and (f) attaching a cover sheet to the upper surface of the channel member.

* * * * *